United States Patent
Chamarti et al.

(10) Patent No.: US 10,608,758 B2
(45) Date of Patent: *Mar. 31, 2020

(54) SIMULATING SERVICE CHANGES IN AN APPLICATION MODULE (AM) IN A WIRELESS COMMUNICATIONS SYSTEM (WCS) TO SIMULATE SITE WALKS IN THE WIRELESS COMMUNICATIONS SYSTEM

(71) Applicant: Corning Optical Communications LLC, Hickory, NC (US)

(72) Inventors: Aravind Chamarti, Ashburn, VA (US); William Patrick Cune, Charlotte, NC (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/056,858

(22) Filed: Aug. 7, 2018

(65) Prior Publication Data
US 2018/0375596 A1 Dec. 27, 2018

Related U.S. Application Data

(63) Continuation of application No. 15/075,414, filed on Mar. 21, 2016, now Pat. No. 10,050,728.

(60) Provisional application No. 62/144,685, filed on Apr. 8, 2015.

(51) Int. Cl.
*H04B 17/318* (2015.01)
*H04B 17/391* (2015.01)
*H04W 48/16* (2009.01)

(52) U.S. Cl.
CPC ....... *H04B 17/318* (2015.01); *H04B 17/3912* (2015.01); *H04W 48/16* (2013.01)

(58) Field of Classification Search
CPC .. H04B 17/318; H04B 17/3912; H04W 48/16
See application file for complete search history.

(56) References Cited

U.S. PATENT DOCUMENTS

| | | | |
|---|---|---|---|
| 5,668,562 | A | 9/1997 | Cutrer et al. |
| 6,085,335 | A | 7/2000 | Djoko et al. |
| 6,711,148 | B1 | 3/2004 | Hills |
| 7,385,384 | B2 | 6/2008 | Rocher |
| 7,881,720 | B2 | 2/2011 | Huang et al. |
| 8,532,580 | B2 | 9/2013 | Elliott et al. |

(Continued)

*Primary Examiner* — Brian D Nguyen
(74) *Attorney, Agent, or Firm* — C. Keith Montgomery

(57) ABSTRACT

Simulating sector changes in an application module (AM) in a wireless communications system (WCS) to simulate site walks in the WCS. The AMs are wireless telecommunication circuitry wired or wirelessly associated with wireless communications system components in a WCS. In one embodiment, the AMs are configured to determine signal information (e.g., signal strength, power and/or quality) of live communications signals in a WCS. The measured signal strength values are then artificially changed to simulate a site walk in the WCS. For example, the signal strength of communication signals received by an AM from a particular sector can be artificially lowered so that the signal strength from a neighboring sector located further away from the AM appears to be stronger. In this manner, a site walk of the AM in the sectors in which communications signals are received by the AM in the WCS can be simulated.

17 Claims, 12 Drawing Sheets

(56) References Cited

U.S. PATENT DOCUMENTS

| | | | |
|---|---|---|---|
| 8,583,100 B2 | 11/2013 | Koziy et al. | |
| 8,744,390 B2 | 6/2014 | Stratford | |
| 2002/0160777 A1 | 10/2002 | Takao et al. | |
| 2005/0148306 A1 | 7/2005 | Hiddink | |
| 2008/0075045 A1* | 3/2008 | Prakash | H04L 45/00 370/331 |
| 2008/0200211 A1 | 8/2008 | Hwang et al. | |
| 2009/0005119 A1* | 1/2009 | Patel | H04W 24/10 455/562.1 |
| 2011/0059741 A1 | 3/2011 | Klein | |
| 2011/0176417 A1 | 7/2011 | Kuwabara | |
| 2012/0038521 A1 | 2/2012 | Zhu et al. | |
| 2012/0269059 A1* | 10/2012 | Gupta | H04W 8/082 370/229 |
| 2013/0148502 A1 | 6/2013 | Yang et al. | |
| 2013/0214909 A1* | 8/2013 | Meijers | H04W 4/029 340/10.5 |
| 2014/0232553 A1* | 8/2014 | Venkatraman | H04Q 9/00 340/870.07 |
| 2014/0323051 A1* | 10/2014 | Hertel | H04W 76/14 455/41.2 |
| 2015/0304929 A1* | 10/2015 | Hua | H04W 36/32 455/436 |
| 2016/0014252 A1* | 1/2016 | Biderman | B60L 15/20 455/420 |
| 2016/0183144 A1* | 6/2016 | Vallabhu | H04W 36/0011 370/331 |
| 2016/0302116 A1 | 10/2016 | Chamarti et al. | |

\* cited by examiner

SIMULATING SERVICE CHANGES IN AN APPLICATION MODULE (AM) IN A WIRELESS COMMUNICATIONS SYSTEM (WCS) TO SIMULATE SITE WALKS IN THE WIRELESS COMMUNICATIONS SYSTEM

CROSS-REFERENCE TO RELATED APPLICATIONS

This application is a continuation of U.S. application Ser. No. 15/075,414, filed Mar. 21, 2016, now U.S. Pat. No. 10,050,728, which claims the benefit of priority under 35 U.S.C. § 119 of U.S. Provisional Application No. 62/144,685, filed on Apr. 8, 2015, the content of which is relied upon and incorporated herein by reference in its entirety.

BACKGROUND

The technology of the present disclosure relates generally to wireless communications systems, including but not limited distributed antenna systems (DASs), and more particularly to simulating service changes in an application module (AM) in a wireless communications system (WCS) to simulate site walks in the wireless communications system.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). WCSs communicate with wireless devices called "clients," "client devices," or "wireless client devices," which reside within the wireless range or "cell coverage area" in order to communicate with an access point device. One example of a WCS is a DAS. DASs are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates an example of distribution of communications services in a WCS. FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

In the DAS 12 in FIG. 1, after installation and commissioning, a site walk is typically performed to analyze the data quality for optimization of the coverage areas 10(1)-10(N) created by the remote antenna units 14(1)-14(N). The site walk may involve activating the DAS 12 for the central unit 16 to receive the downlink communications signals 20D from the base station 18 for distribution to the remote antenna units 14(1)-14(N). Then, a service technician walks around the different coverage areas 10(1)-10(N) with a wireless communication device, such as a mobile phone or laptop computer, to receive the distributed downlink communications signals 20D from the remote antenna units 14(1)-14(N). The received downlink communications signals 20D can be reviewed and analyzed by personnel conducting the site walk to determine the quality of the coverage areas 10(1)-10(N), such as signal strength as an example. The DAS 12 may also be configured to generate alarms indicative of signal quality. Any quality issues in the DAS 12 can be identified and resolved. However, site walks are time consuming and can be prone to human error. Also, site walks may need to be re-performed in an iterative process when configuration changes are made to the DAS 12. Also, the context of the received downlink communications signals 20D is not known. For example, it is not known which received downlink communications signals 20D are being distributed in the DAS 12 and/or how many communications bands are being distributed in the DAS 12.

No admission is made that any reference cited herein constitutes prior art. Applicant expressly reserves the right to challenge the accuracy and pertinency of any cited documents.

SUMMARY

Embodiments disclosed herein include simulating service changes in an application module (AM) in a wireless communications system (WCS) to simulate site walks in the WCS, including but not limited to distributed antenna systems (DASs). Related systems and methods are also disclosed. The AMs include wireless telecommunication circuitry associated with a wireless communications system component(s) that is configured to execute one or more software applications for determining and analyzing wireless communication system information. The AMs may be wired into components in the WCS or AMs wirelessly networked into other AMs in the WCS. By associating the AMs into components of a WCS, live communications signals in the WCS can be monitored and measured for monitoring the performance of components within the WCS. In one embodiment, the AMs are configured to determine signal information about live communications signals in a WCS, including at the start and end points of the links in the WCS. The measured values of these live signals are artificially controlled and/or changed to simulate a site walk in the WCS. For example, the signal strength, signal quality, and/or signal power of communication signals received by an AM from a particular sector can be artificially lowered so that the signal information from a neighboring sector located further away from the AM appears to be stronger. A sector is a communications service area in a WCS. In this manner, a site walk of the sectors in the WCS in which communications signals are received by the AM can be simulated, and in real-time if desired, without the requirement for a manual site walk and associated technician labor. The information received by the AM regarding communications signals from the sectors in the WCS along with other contextual information can then be reported to, including but not limited to, a head-end unit in the WCS, remote units, a base station communicatively coupled to the WCS, and/or otherwise to a customer or relevant party for the WCS. This site walk simulation can also be performed by an AM without interfering with normal communications services provided in the WCS.

The AMs may also be multiple application modules (MAMs) as an example. The AMs can include a multiple application software platform architecture that includes one or more application level applications configured to receive and monitor signals in the WCS, and to provide application level information about such monitored signals to other components or systems, or technicians. The application level information can be used by a technician or other system to diagnose or calibrate the WCS and/or the communications components provided therein.

One embodiment of the disclosure relates to an application module configured to be associated with a communications component of a WCS. The application module comprises at least one communications interface configured to receive communications signals from a plurality of sectors (i.e., communications service areas) in a WCS. The application module also comprises a power meter communicatively coupled to the at least one communications interface. The power meter is configured to measure signal strength of the received communications signals. The application module also comprises at least one processor. The at least one processor is configured to execute an emulation application to artificially change signal information of received communications signals from a first sector among the plurality of sectors in the WCS. The at least one processor is further configured to execute a roaming application to receive the artificially changed signal information of received communications signals from the first sector, determine if the application module is to leave or join a second sector among the plurality of sectors based on the received artificially changed signal information of received communications signals, and join a second sector among the plurality of sectors if the received artificially changed signal information of received communications signals from the first sector is less than the signal information of the second sector to simulate a site walk of the application module from the first sector to the second sector in the WCS. The at least one processor is also configured to communicate information regarding received signal information of the communications signals from the first sector and the second sector to communicate simulated site walk information of the application module in the WCS.

Another embodiment of the disclosure relates to a method of simulate a site walk in a WCS. The method comprises receiving communications signals in an application module associated with a communications component of a WCS from a plurality of sectors in the WCS. The method further comprises determining the signal information of the received communications signals. The method further comprises artificially changing the signal information of received communications signals from a first sector among the plurality of sectors in the WCS. The method further comprises receiving the artificially changed signal information of received communications signals from the first sector. The method further comprises determining if the application module is to leave or join a second sector among the plurality of sectors based on the received artificially changed signal information of received communications signals from the first sector. The method further comprises joining a second sector among the plurality of sectors if the received artificially changed signal information of received communications signals from the first sector is less than the signal information of the second sector to simulate a site walk of the application module from the first sector to the second sector in the WCS. The method further comprises communicating information regarding received signal information of the communications signals from the first sector and the second sector to communicate simulated site walk information of the application module in the WCS.

Another embodiment of the disclosure relates to a WCS. The WCS comprises a central unit. The central unit is configured to receive a downlink communications signal from a communications system. The central unit is also configured to distribute the downlink communications signal over at least one downlink communications medium to a plurality of remote units. The central unit is also configured to receive an uplink communications signal from the plurality of remote units over at least one uplink communications medium. The central unit is also configured to distribute the uplink communications signal to the communications system. Each remote unit among the plurality of remote units is configured to receive the downlink communications signal from the central unit over the at least one downlink communications medium. Each remote unit among the plurality of remote units is also configured to distribute the downlink communications signal to a client device. Each remote unit among the plurality of remote units is also configured to receive the uplink communications signal from the client device. Each remote unit among the plurality of remote units is also configured to distribute the uplink communications signal to the central unit over the at least one uplink communications medium. The WCS further comprises at least one application module configured to be associated with at least one of the central unit and a remote unit among the plurality of remote units. The at least one application module comprises at least one communications interface configured to receive communications signals from a plurality of sectors in a WCS. The at least one application module further comprises a power meter communicatively coupled to the at least one communications interface. The power meter is configured to measure signal information of the received communications signals. The at least one application module further comprises at least one processor. The at least one processor is configured to execute an emulation application to artificially change the signal information of received communications signals from a first sector among the plurality of sectors in the WCS. The at least one processor is also configured to execute a roaming application. The roaming application is configured to receive the artificially changed signal information of received communications signals from the first sector, determine if the at least one application module is to leave or join a second sector among the plurality of sectors based on the received artificially changed signal information of received communications signals from the first sector, and join a second sector among the plurality of sectors if the received artificially changed signal information of received communications signals from the first sector is less than the signal information of the another sector to simulate a site walk of the at least one application module from the first sector to the second sector in the WCS. The at least one processor is further configured to communicate information regarding received signal information of the communications signals from the first sector and the second sector to communicate simulated site walk information of the at least one application module in the WCS.

Another embodiment of the disclosure relates to a non-transitory computer-readable medium having stored thereon computer executable instructions to cause a processor-based application module associated with a communications component in a wireless communications system (WCS) to: receive communications signals in an application module associated with a communications component of a WCS from a plurality of sectors in the WCS; measure signal strength of the received communications signals; artificially change the signal strength of received communications signals from a first sector among the plurality of sectors in the WCS; receive the artificially changed signal strength of received communications signals from the first sector; determine if the application module is to leave or join a second sector among the plurality of sectors based on the received artificially changed signal strength of received communications signals from the first sector; join a second sector among the plurality of sectors if the received artificially changed signal strength of received communications signals from the first sector is less than the signal strength of the second sector to simulate a site walk of the application module from the first sector to the second sector in the WCS; and communicate information regarding received signal strength of the communications signals from the first sector and the second sector to communicate simulated site walk information of the application module in the WCS.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Various embodiments will be further clarified by the following examples.

Embodiments disclosed herein include simulating service area changes in an application module (AM) in a wireless communications system (WCS) to simulate site walks in the WCS, including but not limited to distributed antenna systems (DASs). Related systems and methods are also disclosed. A WCS can also include wireless and wired communications. The AMs include wireless telecommunication circuitry associated with a wireless communications system component(s) for determining and analyzing wireless communications system information. The AMs may be wired into components in the WCS or AMs wirelessly networked into other AMs in the WCS. By associating the AMs into components of a WCS, live communications signals in the WCS can be monitored and measured for monitoring the performance of components within the WCS. In one embodiment, the AMs are configured to determine signal information about live communications signals in a WCS, including at the start and end points of the links in the WCS. The measured values of these live signals are artificially controlled and/or changed to simulate a site walk in the WCS. For example, the signal strength, signal quality, and/or signal power of communication signals received by an AM from a particular sector can be artificially lowered so that the signal information from a neighboring sector located further away from the AM appears to be stronger. A sector is a communications service area in the WCS. In this manner, a site walk of the sectors in the WCS in which communications signals are received by the AM can be simulated, and in real-time if desired, without the requirement for a manual site walk and associated technician labor. The information received by the AM regarding communications signals from the sectors in the WCS along with other contextual information can then be reported to, including but not limited to, a head-end unit in the WCS, remote units, a base station communicatively coupled to the WCS, and/or otherwise to a customer or relevant party for the WCS. This site walk simulation can also be non-communications service impacting to allow the communications services to continue to be provided in the WCS during simulated site walks.

Before discussing the particular exemplary aspects of simulating sector changes in an AM in a wireless communications system to simulate site walks therein starting at FIG. 8, exemplary AMs that can be incorporated, wired or wirelessly, into components of a WCS to monitor live communications signals and measure and charge signal strength of communications signals distributed therein are first described with regard to FIGS. 2-7 below.

Figure 1:
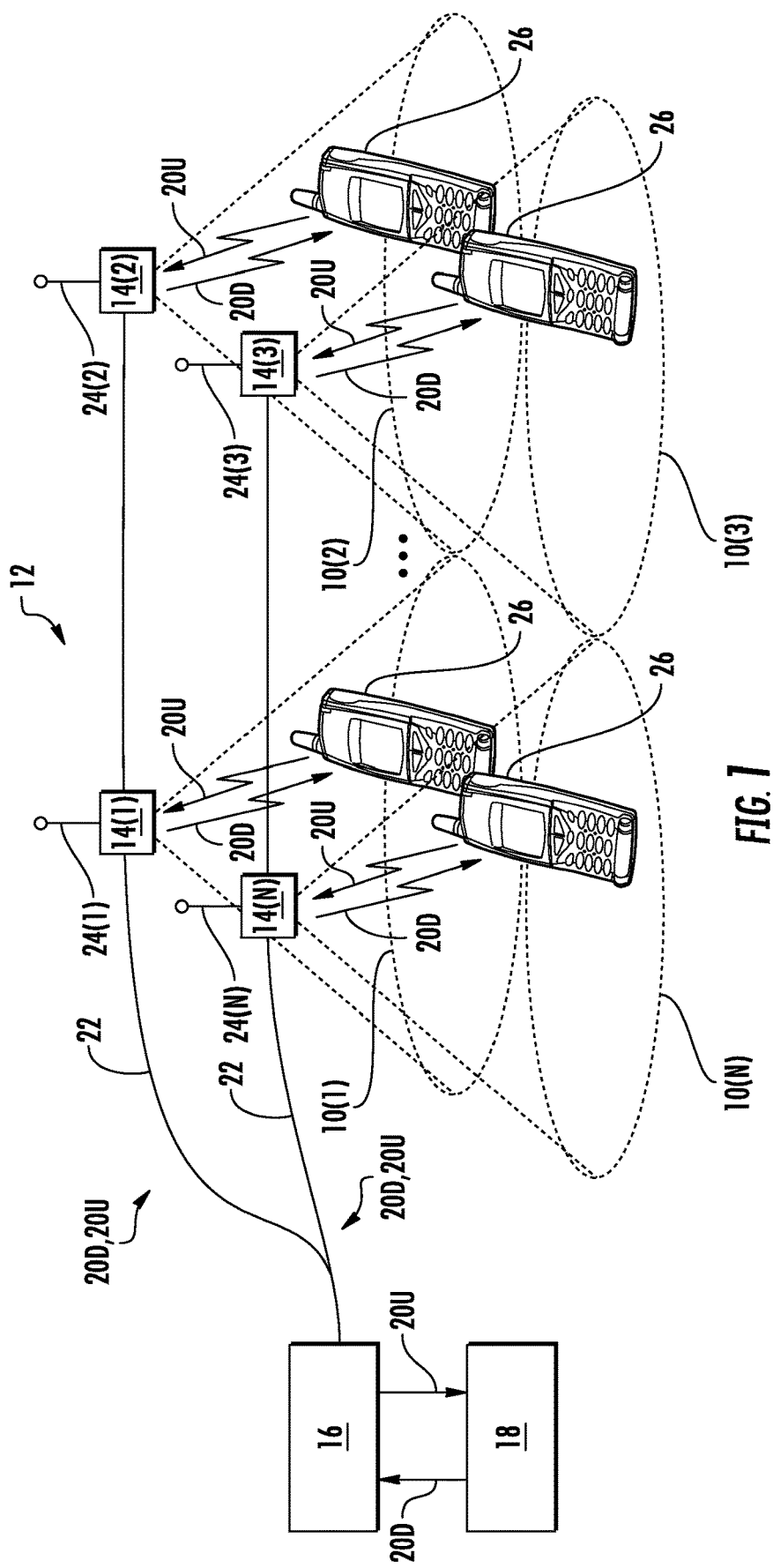
FIG. 1 is a schematic diagram of an exemplary wireless communications system (WCS) in the form of a distributed antenna system (DAS) capable of distributing radio frequency (RF) communications services to client devices.
Figure 2:
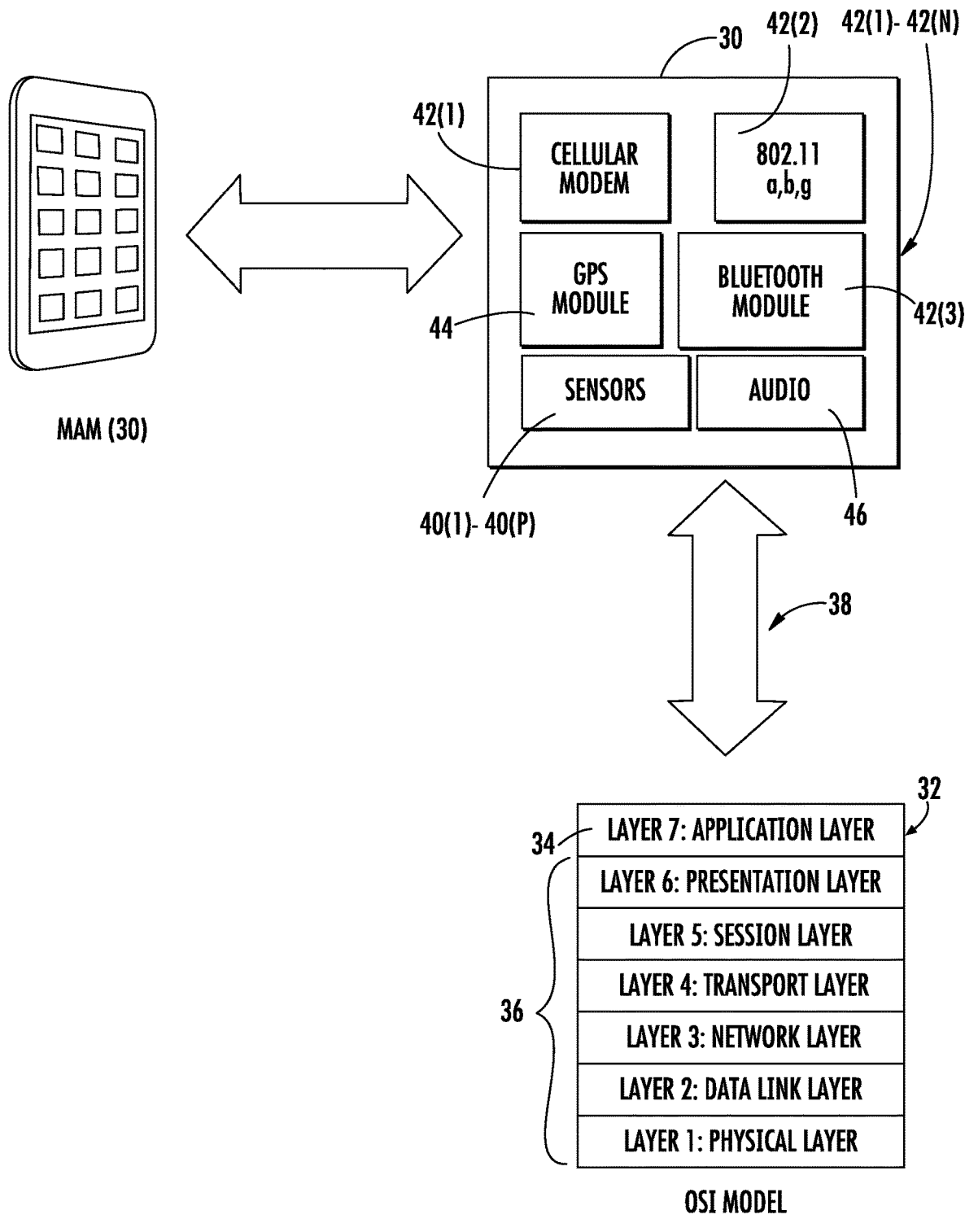
FIG. 2 is a schematic diagram of an exemplary application module (AM) that can be associated with one or more components of a DAS WCS to monitor live signals in the WCS, create application level information about the monitored signals, and communicate the application level information to other systems.

In this regard, FIG. 2 is a schematic diagram of an exemplary AM provided in the form of a MAM 30. The MAM 30 can be associated with one or more components of a WCS as a client device to monitor live signals (e.g., component power, RF power or communications signals) in the WCS and create application level information (e.g., application level data) about the monitored signals. The MAM 30 is configured with one or more application layer applications 32, such as provided in an application layer 34 of an OSI model, as a non-limiting example. In this example, an application layer application 32 is configured to retrieve information about monitored signals in a WCS from lower layers 36 in the MAM 30 to generate application level information 38 about the monitored signals. Context information can be included in the application level information 38 about the monitored signals for additional information that requires application level processing, as opposed to lower layer signal monitoring that may not include context information.

For example, the MAM 30 may include one or more sensors 40(1)-40(P) that can be employed to sense information about monitored signals in a WCS that is provided to software application layer application 32 (also referred to herein as "application layer application 32") in the application layer 34 of the MAM 30 to generate application level information 38 about the monitored signals. For example, one of the sensors 40 may be a power level detector configured to determine a power level (e.g., a RF power level) of a monitored signal, wherein the application level information 38 relates to power level of the monitored signals. As an example, the application level information 38 may include a history of power level information for the monitored signal, as opposed to just a physical level power level, for additional context information. Thus, the power level information in the application level information 38 may be more useful in calibrating gain levels in the WCS than just one power level about the monitored signal. The application layer application 32 in the MAM 30 can then communicate this application level information 38 through a communications interface to other systems for use in diagnosing and/or calibrating a WCS. Further, because the application layer applications 32 in the MAM 30 may be open architecture applications, customers or technicians may be able to load their own application layer applications in the MAM 30, including customized applications, for monitoring signals in their WCS and providing application level information 38, and/or forming an application network.

In this regard, with continuing reference to FIG. 2, the MAM 30 in this embodiment includes a number of communications interfaces 42(1)-42(N) that can communicate the application level information 38 to other systems. For example, the communications interfaces 42 can include a cellular modem 42(1), WiFi interface 42(2), and Bluetooth module 42(3), as shown in FIG. 2. As will be described in more detail below, the MAM 30 will be incorporated into a WCS component as a client device that is capable of receiving communications distributed through the DAS, such as cellular communications signals through the cellular modem 42(1) and WiFi signals through the WiFi interface 42(2). Because, the MAM 30 appears as a client device in the WCS, the MAM 30 can also transmit communications signals through a communications interface 42 within a WCS like client devices, or outside the WCS, to other recipients, including technician or service personnel communications devices to provide the application level information 38 about monitored signals. The Bluetooth module 42(3) in this example allows for local communications to the MAM 30 to retrieve application level information 38 outside of the WCS, if desired. Also, because the MAM 30 has the functionality of a client device in the WCS, the MAM 30 may also be configured to receive calls or other communications from another system through the WCS to retrieve the application level information 38 from the MAM 30. In this regard, the application layer applications 32 in the MAM 30 may facilitate the MAM 30 to initiate providing application level information 38 to other systems without being requested, such as due to alarm conditions or other criteria or thresholds being exceeded.

The MAM 30 may also have other components that are useful in monitoring signals in a WCS. For example, the MAM 30 may include a global positioning module (GPS) 44 that can allow the MAM 30 to determine its location and communicate this location in conjunction with application level information 38. The MAM 30 may also include an audio component 46, such as to allow the MAM 30 to respond to voice commands or provide application level information 38 about monitored signals audially, as examples.

Because the MAM 30 provides application layer application 32 for providing application level information 38 about monitored signals, less cost and faster development times may be realized since changes to the application layer applications can be made in software rather than through hardware updates. The MAM 30 allows uploads for new application layer applications 32 to be provided in the application layer 34 or updates to existing application layer applications 32 in the application layer 34. Also, by allowing for application layer applications 32 in the MAM 30, outsider developers, including individual developers, can develop third party software applications for the MAM 30 for further availability to WCS application layer applications for cost effective development.

Figure 3A:
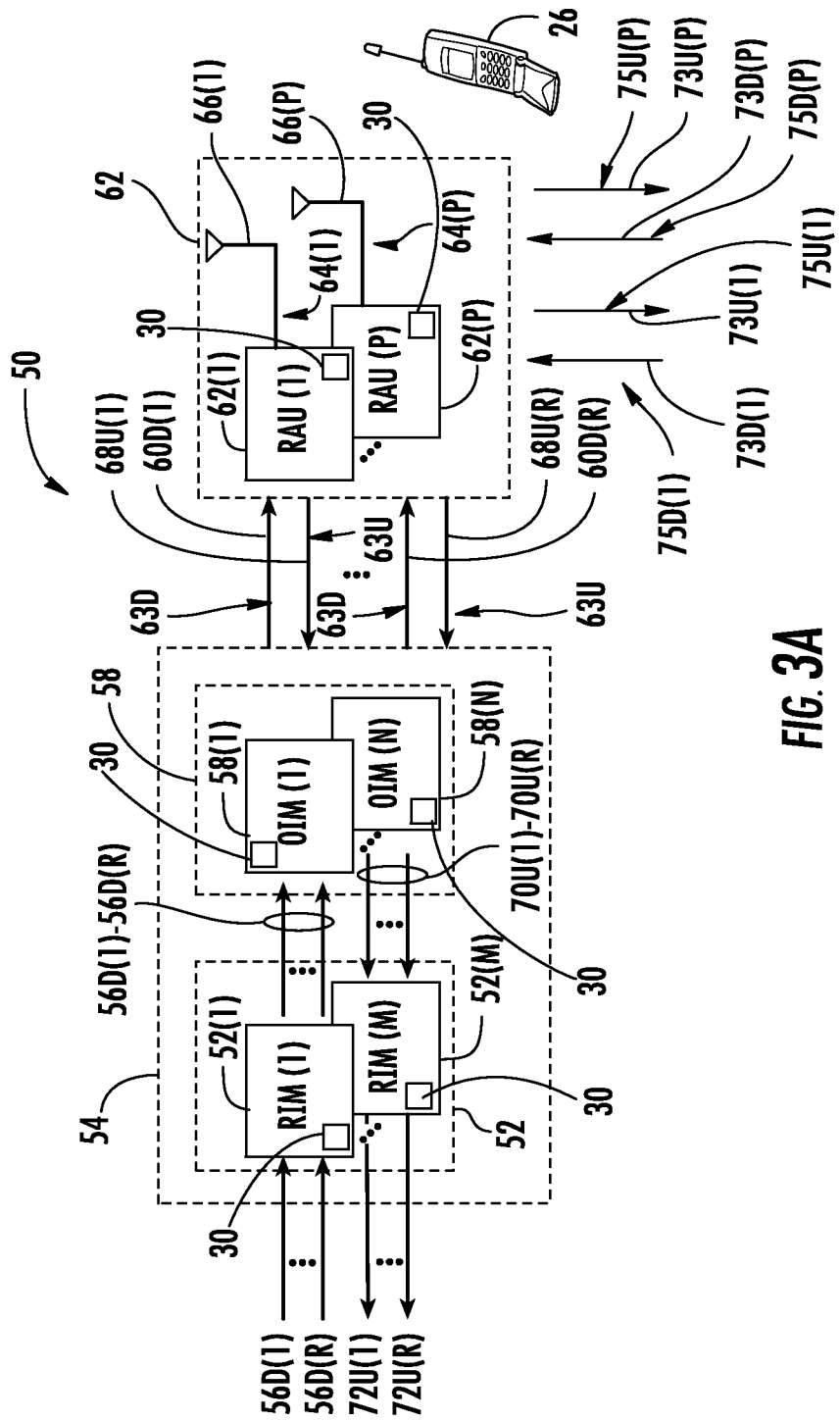
FIGS. 3A and 3B are schematic diagrams illustrating an exemplary optical fiber-based DAS that includes components in which the AM in FIG. 2 can be included.

FIG. 3A is a schematic diagram of another exemplary optical fiber-based distributed antenna system (DAS) 50 as an example of a WCS that may include MAMs 30 in a communications component in FIG. 2 for monitoring of signals. In this embodiment, the optical fiber-based DAS 50 includes optical fiber for distributing RF communication services. The optical fiber-based DAS 50 in this embodiment is comprised of three (3) main components. One or more communications component radio interfaces provided in the form of radio interface modules (RIMs) 52(1)-52(M) in this embodiment are provided in head end equipment (HEE) 54 communications component to receive and process downlink electrical RF communications signals 56D(1)-56D(R) from one or more base stations 57(1)-57(T) (FIG. 3B) prior to optical conversion into downlink optical RF communications signals. The RIMs 52(1)-52(M) provide both downlink and uplink interfaces. The notations "1-R" and "1-M" indicate that any number of the referenced component, 1-R and 1-M, respectively, may be provided. MAMs 30 can be included in the RIMs 52(1)-52(M) or provided in the same location, housing, or packaging as the RIMs 52(1)-52(M), to monitor the downlink electrical RF communications signals 56D(1)-56D(R) prior to optical conversion into downlink optical RF communications signals. As will be described in more detail below, the HEE 54 is configured to accept a plurality of RIMs 52(1)-52(M) as modular components that can easily be installed and removed or replaced in the HEE 54. In one embodiment, the HEE 54 is configured to support up to eight (8) RIMs 52(1)-52(8).

Each RIM 52(1)-52(M) can be designed to support a particular type of radio source or range of radio sources (i.e., frequencies) to provide flexibility in configuring the HEE 54 and the optical fiber-based DAS 50 to support the desired radio sources. For example, one RIM 52 may be configured to support the Personal Communication Services (PCS) radio band. Another RIM 52 may be configured to support the 700 MHz radio band. In this example, by inclusion of these RIMs 52, the HEE 54 would be configured to support and distribute RF communications signals on both PCS and LTE 700 radio bands. RIMs 52 may be provided in the HEE 54 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 52 may be provided in the HEE 54 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 52 may be provided in the HEE 54 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 56D(1)-56D(R) are provided to a plurality of optical interfaces provided in the form of optical interface modules (OIMs) 58(1)-58(N) in this embodiment to convert the downlink electrical RF communications signals 56D(1)-56D(N) into downlink optical RF communications signals 60D(1)-60D(R). MAMs 30 can also be included in the OIMs 58(1)-58(N) communications component, or provided in the same location, housing, or packaging as the OIMs 58(1)-58(N), to monitor the downlink electrical RF communications signals 56D(1)-56D(R) prior to optical conversion into downlink optical RF communications signals 60D(1)-60D(R). The notation "1-N" indicates that any number of the referenced component 1-N may be provided. The OIMs 58 may be configured to provide one or more optical interface components (OICs) that contain O/E and E/O converters, as will be described in more detail below. The OIMs 58 support the radio bands that can be provided by the RIMs 52, including the examples previously described above. Thus, in this embodiment, the OIMs 58 may support a radio band range from 400 MHz to 2700 MHz, as an example, so providing different types or models of OIMs 58 for narrower radio bands to support possibilities for different radio band-supported RIMs 52 provided in the HEE 54 is not required. Further, as an example, the OIMs 58 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 58(1)-58(N) each include E/O converters to convert the downlink electrical RF communications signals 56D(1)-56D(R) to downlink optical RF communications signals 60D(1)-60D(R). The downlink optical RF communications signals 60D(1)-60D(R) are communicated over downlink communications medium in the form of downlink optical fiber(s) 63D(1) in this example to a plurality of remote antenna units (RAUs) 62(1)-62(P). The notation "1-P" indicates that any number of the referenced component 1-P may be provided. O/E converters provided in the RAUs 62(1)-62(P) convert the downlink optical RF communications signals 60D(1)-60D(R) back into downlink electrical RF communications signals 56D(1)-56D(R), which are provided over downlinks 64(1)-64(P) coupled to antennas 66(1)-66(P) in the RAUs 62(1)-62(P) to client devices 26 in the reception range of the antennas 66(1)-66(P). MAMs 30 can also be included in the RAUs 62(1)-62(P), or provided in the same location, housing, or packaging as the RAUs 62(1)-62(P), to monitor the downlink electrical RF communications signals 56D(1)-56D(R).

Figure 3B:
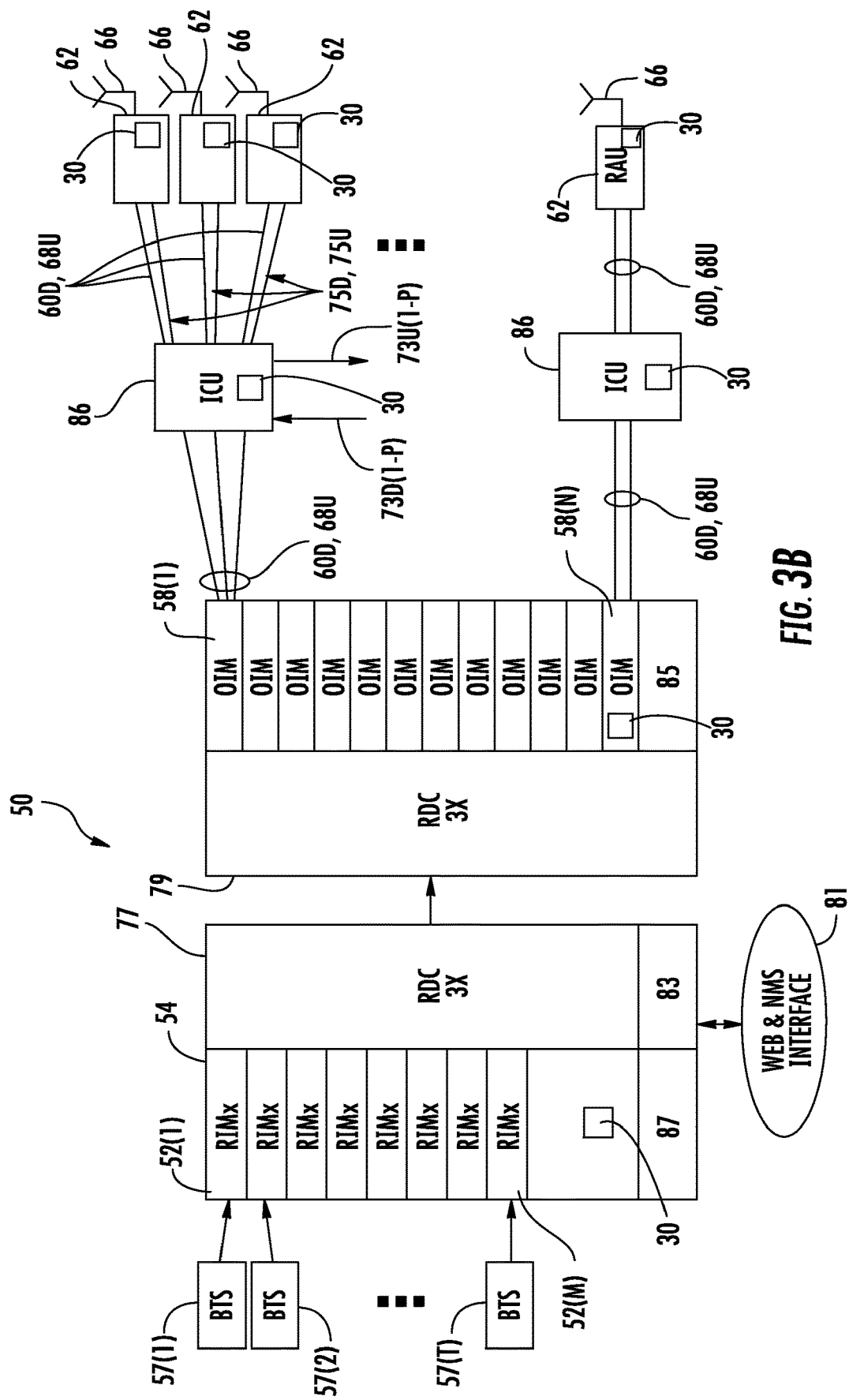

E/O converters are also provided in the RAUs 62(1)-62(P) communications components to convert uplink electrical RF communications signals received from client devices 26 through the antennas 66(1)-66(P) into uplink optical RF communications signals 68U(1)-68U(R) to be communicated over uplink communications medium in the form of uplink optical fibers 63U in this example to the OIMs 58(1)-58(N). The MAMs 30 associated with the RAUs 62(1)-62(P) can also monitor the uplink electrical RF communications signals 56U(1)-56U(R). The OIMs 58(1)-58(N) include O/E converters that convert the uplink optical RF communications signals 68U(1)-68U(R) into uplink electrical RF communications signals 70U(1)-70U(R) that are processed by the RIMs 52(1)-52(M) and provided as uplink electrical RF communications signals 72U(1)-72U(R). Downlink electrical digital signals 73D(1)-73D(P), such as Ethernet signals, communicated over downlink electrical medium or media (hereinafter "medium") 75D(1)-75D(P) can be provided to the RAUs 62(1)-62(P), such as from a digital data services (DDS) controller and/or DDS switch as provided by example in FIG. 3B, separately from the RF communication services, as well as uplink electrical digital signals 73U(1)-73U(P) communicated over uplink electrical medium 75U(1)-75U(P), as also illustrated in FIG. 3B. MAMs 30 associated with the OIMs 58(1)-58(N) and/or the RIMs 52(1)-52(M) can also monitor the uplink electrical RF communications signals 70U(1)-70U(R). Common elements between FIGS. 3A and 3B are illustrated in FIG. 3B with common element numbers. Power may be provided in the downlink and/or uplink electrical medium 75D(1)-75D(P) and/or 75U(1)-75U(P) to the RAUs 62(1)-62(P).

FIG. 3B is a schematic diagram of providing digital data services and RF communication services to RAUs and/or other remote communications units in the optical fiber-based DAS 50 of FIG. 3A. Common components between FIGS. 3A and 3B have the same element numbers and thus will not be re-described. As illustrated in FIG. 3B, a power supply module (PSM) 83 may be provided to provide power to the RIMs 52(1)-52(M) and radio distribution cards (RDCs) 77 that distribute the RF communications from the RIMs 52(1)-52(M) to the OIMs 58(1)-58(N) through RDCs 79. In one embodiment, the RDCs 77, 79 can support different sectorization needs. A PSM 85 may also be provided to provide power the OIMs 58(1)-58(N). An interface 81, which may include web and network management system (NMS) interfaces, may also be provided to allow configuration and communication to the RIMs 52(1)-52(M) and other components of the optical fiber-based DAS 50. A microcontroller, microprocessor, or other control circuitry, called a head-end controller (HEC) 87 may be included in HEE 54 to provide control operations for the HEE 54. The MAMs 30 may also be incorporated into or associated with one or more interconnect units (ICUs) 86, as shown in FIG. 3B, to monitor power signals as the ICUs 86 provide power signals to the RAUs 62(1)-62(P) or route information about other monitored signals to other components or other MAMs 30 in the DAS 50.

Figure 4:
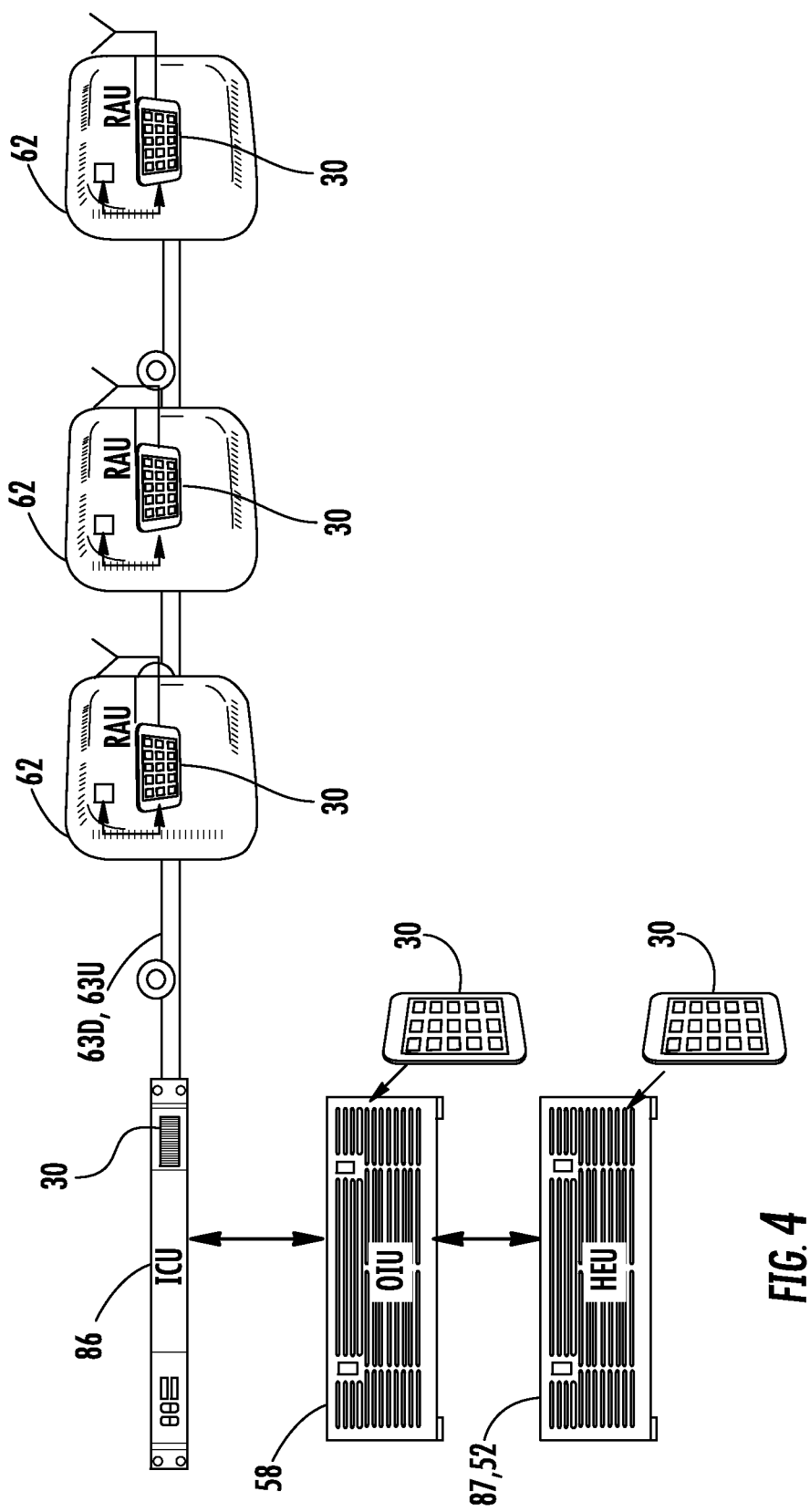
FIG. 4 is a schematic diagram of exemplary DAS components of a DAS in which the AM in FIG. 2 can be associated to monitor live signals in the WCS, create application level information about the monitored signals, and communicate the application level information to other systems.

FIG. 4 is another schematic diagram of exemplary DAS components of the DAS 50 in which the MAM 30 in FIG. 2 can be associated with to monitor live signals in the WCS, create application level information about the monitored signals, and communicate the application level information to other systems. The MAM 30 can communicate application layer data 38 as client devices in the DAS 50 to other devices outside the DAS 50, or to other MAMs 30 in other components in the DAS 50. The MAM 30 may also serve as a network device, such as an access point, to collect monitored signal information, including application level information, from other MAMs 30 and/or components in the DAS 50, which can be passed along to other components or systems.

Figure 5:
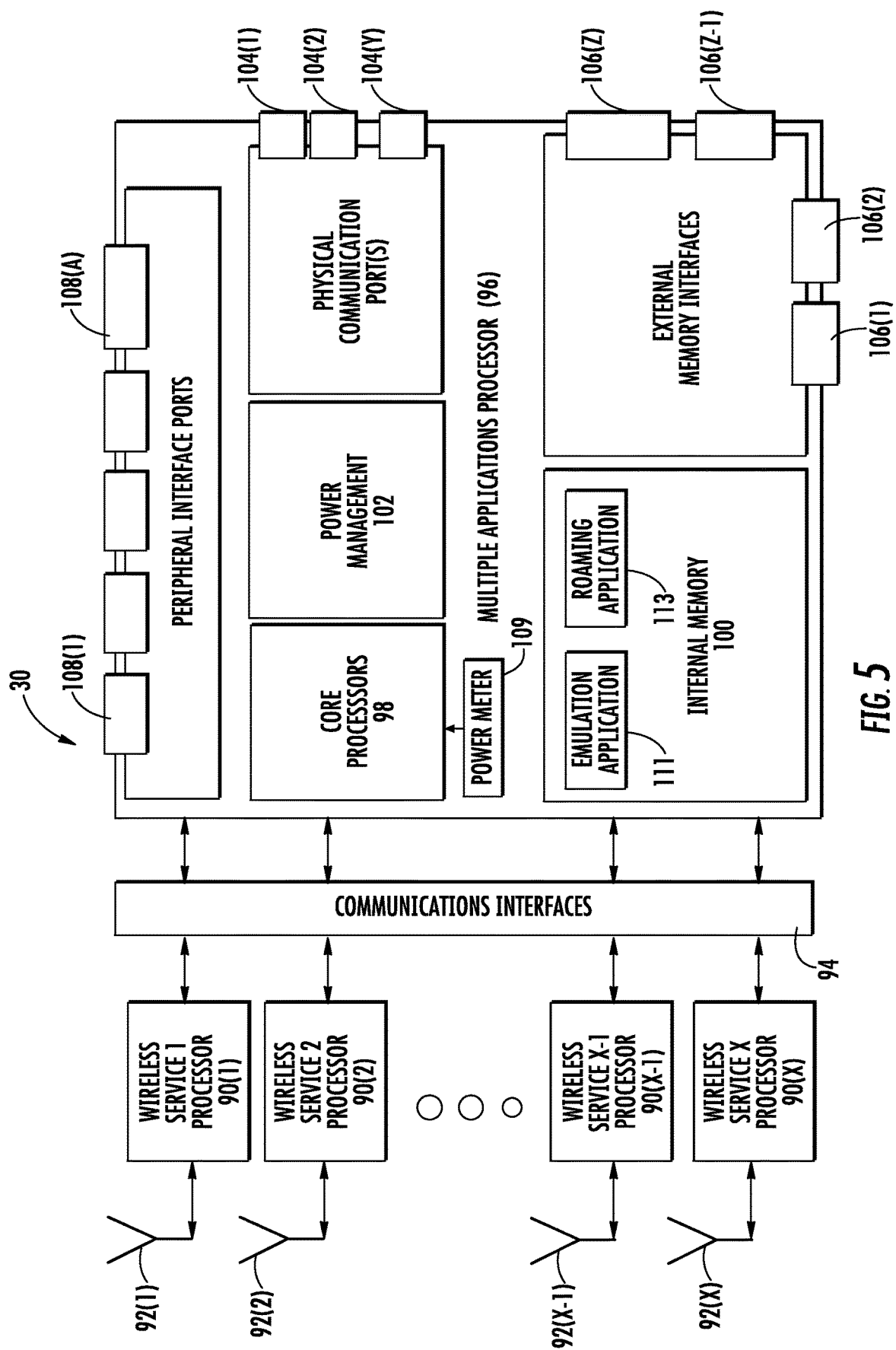
FIG. 5 is a schematic diagram illustrating exemplary internal components of the AM in FIG. 2 to monitor signals in a component of a WCS.

FIG. 5 is a schematic diagram illustrating exemplary internal components of the MAM 30 in FIG. 2 to monitor signals in a component of a WCS, including but not limited to the DAS 50 in FIGS. 3A and 3B. As illustrated in FIG. 5, the MAM 30 includes a series of wireless service processors 90(1)-90(X) that are configured to receive wireless communications signals over respective antennas 92(1)-92(X). The wireless service processors 90(1)-90(X) facilitate the MAM 30 communicating application level information 38 received through a communications interface 94 wirelessly in a WCS, as another client device. The wireless service processors 90(1)-90(X) also facilitate the MAM 30 being able to communicate application level information 38 wired or wirelessly to other systems outside the WCS, if desired.

With continuing reference to FIG. 5, the MAM 30 includes a processor-based system 96 that may include multiple processors or a multi-core processor 98, as examples, (hereinafter "processor 98") where the application layer applications 32 reside and are executed. As discussed above, the application layer applications 32 monitor signals in a WCS and provide the application level information 38 regarding such monitored signals over the communications interface 94 to other systems, within and/or outside of a WCS. The application layer applications 32 are stored in internal memory 100. The application level information 38 can also be stored by the processor 98 in the internal memory 100. The processor-based system 96 includes a power management module 102 to manage power consumption in the processor-based system 96, such as to achieve the desired performance levels. The MAM 30 also includes one or more physical communications ports 104(1)-104(Y) to allow wired communications to be provided to and from the MAM 30, if desired. For example, a technician may connect a wired communication device to one of the physical communications ports 104 to retrieve application level information 38 or load or update application layer applications 32. The MAM 30 may also include one or more external memory interfaces 106(1)-106(Z), such as memory card ports, USB ports, etc. for storing data from internal memory 100, including application level information 38. The MAM 30 may also include one or more peripheral interface ports 108(1)-108(A) for connecting other peripheral devices to the MAM 30.

With continuing reference to FIG. 5, a power meter 109, which may be a digital power meter for example, can also be included in the MAM 30. The power meter 109 is configured to measure power, including signal strength, of the communications signals received through the physical communications ports 104(1)-104(Y). In one aspect, as shown in FIG. 5, the internal memory 100 may include an emulation application 111 in the form of instructions that are configured to be executed by a core processor(s) 98. The emulation application 111 may be configured to artificially lower the measured signal strength of communications signals measured by the power meter 109 to make it appear that communications signals received from a neighboring sector (i.e., communications service areas) in the WCS are stronger in signal strength, and thus the MAM 30 is located closer to the neighboring sector. The artificially controlled signal strength of received communication signals can then be provided to a roaming application 113, which may also be provided as instructions in the internal memory 100 to be executed by a core processor(s) 98 in the MAM 30, that performs the roaming, handoff, and related reporting applications for the MAM 30 communications with sectors in a WCS. In this manner, a site walk of the sectors in the WCS in which communications signals are received by the MAM 30 can be simulated, and in real-time if desired, without the requirement for a manual site walk and associated technician labor. The information received by the MAM 30 regarding communications signals from the sectors in the WCS along with other contextual information can then be reported to, including but not limited to, a head-end unit in the WCS, remote units, a base station communicatively coupled to the WCS, and/or otherwise to a customer or relevant party for the WCS. This site walk simulation can also be non-communications service impacting to allow the communications services to continue to be provided in the WCS during simulated site walks.

Figure 6:
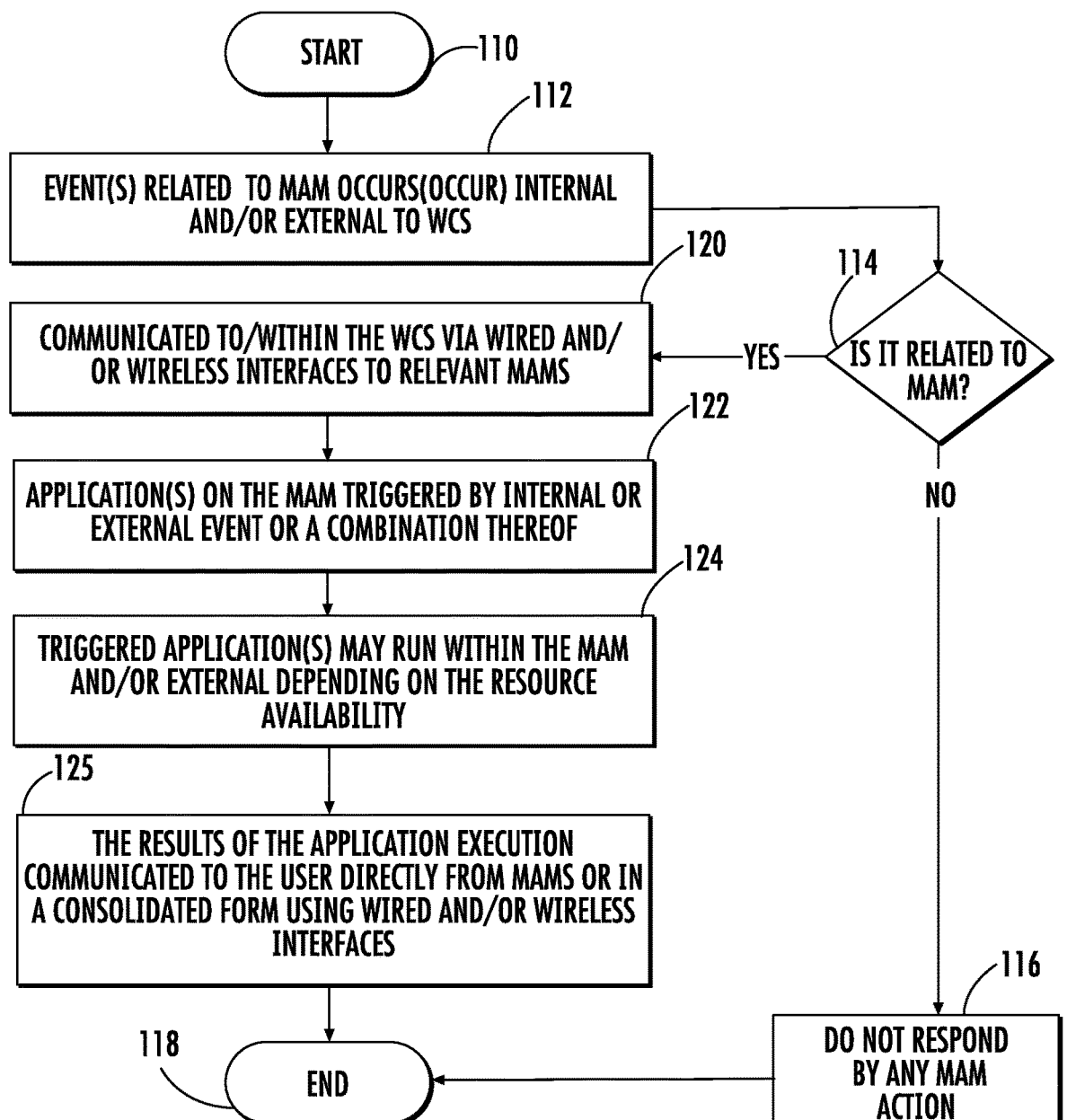
FIG. 6 is a flowchart illustrating an exemplary process of an AM to monitor live signals in the WCS, create application level information about the monitored signals, and communicate the application level information to other systems.
Figure 7:
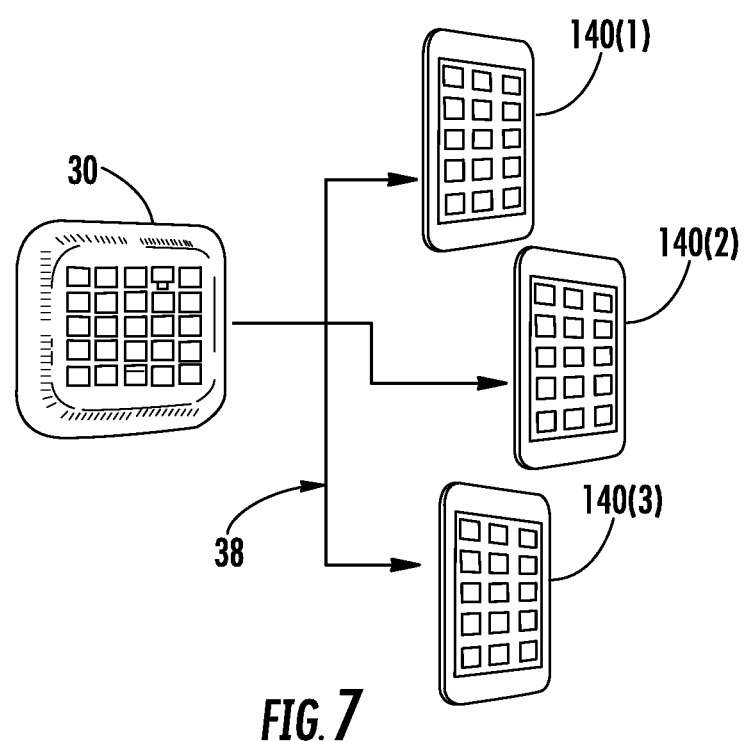
FIG. 7 is schematic diagram of a MAM wirelessly communicating application level information about monitored signals to other portable devices.

FIG. 6 is a flowchart illustrating an exemplary process of a MAM 30 monitoring live signals in a WCS, creating application level information about the monitored signals, and communicating the application level information to other systems. This process can be performed according to an application layer application 32 executing in the processor 98 of the MAM 30. In this regard, the process starts (block 110). External or internal events related to monitoring of signals in a WCS or request for the application level information 38 for MAM 30 will occur (block 112). If the MAM 30 determines that these events are not related (block 114), the MAM 30 does not respond to such events (block 116) and the process ends (block 118). If the event detected by the MAM 30 is related to monitoring of signals or requests to communicate the application level information 38 to other systems in the MAM 30 (block 114), the MAM 30 communications to or within the WCS via wired or wireless communications related to the detected event (block 120). The application layer application 32 on the MAM 30 is triggered by the internal or external event, or a combination thereof (block 122). The triggered application layer application 32 may execute with the MAM 30 and/or external to the MAM 30 depending on resource availability in the MAM 30 (block 124). The application level information 38 generated by the application layer application 32 executing based on signal monitoring can be communicated directly to a user from the MAM 30 or in a consolidated form with other application level information 38 stored in internal memory 100 using wired or wireless communications (block 125), and the process ends (block 118). For example, FIG. 7 is a schematic diagram of a MAM 30 wirelessly, or through wired communication, communicating application level information 38 about monitored signals to other portable devices 140(1)-140(3).

As discussed above, it may be desired to perform site walks in a WCS to measure communications signals in the WCS. The measured communications signals can then be analyzed to determine the quality of the signal distributed components and communications signals distributed therein. This information can be communicated to a customer or technician to determine if the WCS is configured as desired and if the communications signals being distributed in the WCS are being distributed in a desired manner with the desired signal coverage and quality. However, site walks in a WCS are time consuming and can be prone to human error. Also, site walks may need to be re-performed in an iterative process when configuration changes are made to the WCS. Also, the context of the received downlink communications signals is not known. For example, it is not known which received downlink communications signals are being distributed in the WCS and/or how many communications bands are being distributed in the WCS.

In this regard, the AMs described above and herein can also be configured to measure live communications signals in a WCS, including at the start and end points of the links in the WCS. The measured values of these live signals can be artificially controlled and/or changed to simulate a site walk in the WCS. For example, the signal strength of communication signals received by an AM from a particular sector can be artificially lowered so that the signal strength from a neighboring sector located further away from the AM appears to be stronger. In this manner, a site walk of the sectors in the WCS in which communications signals are received by the AM can be simulated, and in real-time if desired, without the requirement for a manual site walk and associated technician labor. The information received by the AM regarding communications signals from the sectors in the WCS along with other contextual information can then be reported to, including but not limited to, a head-end unit in the WCS, remote units, a base station communicatively coupled to the WCS, and/or otherwise to a customer or relevant party for the WCS. This site walk simulation can also be non-communications service impacting to allow the communications services to continue to be provided in the WCS during simulated site walks.

Figure 8:
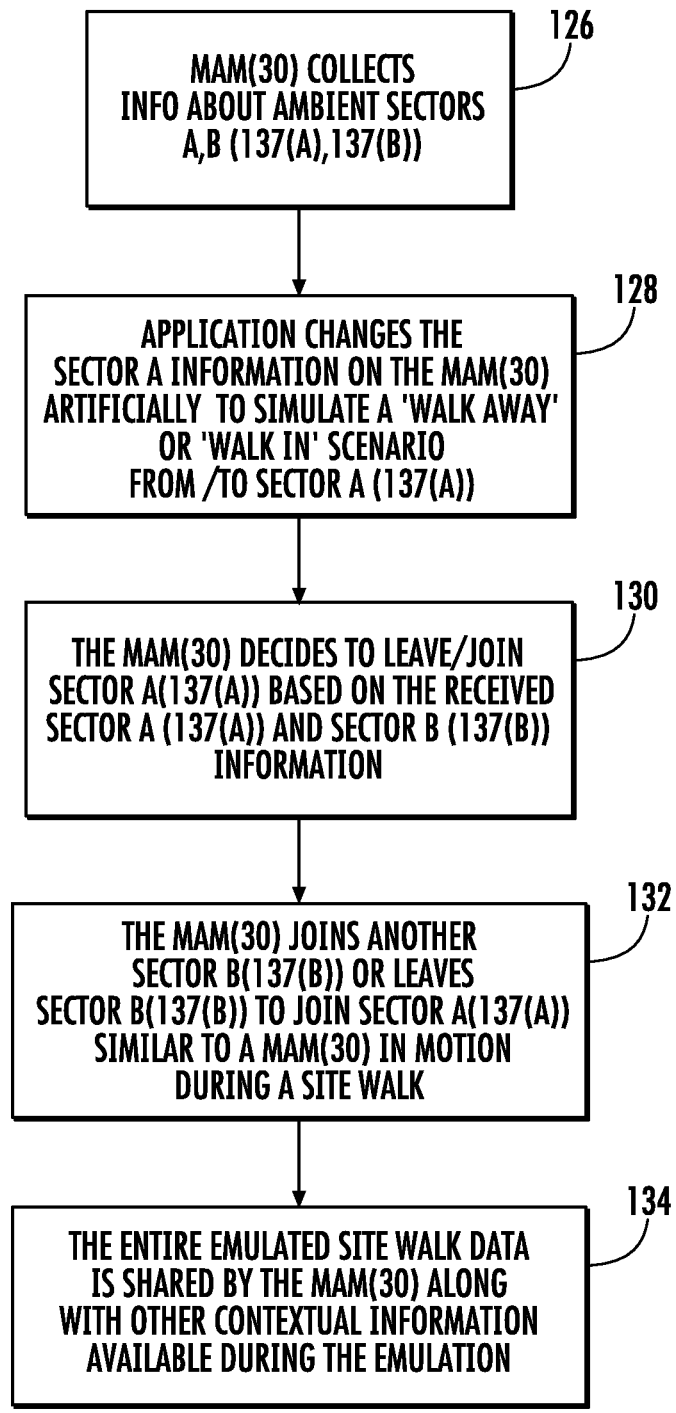
FIG. 8 is a flowchart illustrating an exemplary process of simulating sector changes in an AM in a WCS to simulate site walks in the WCS.
Figure 9:
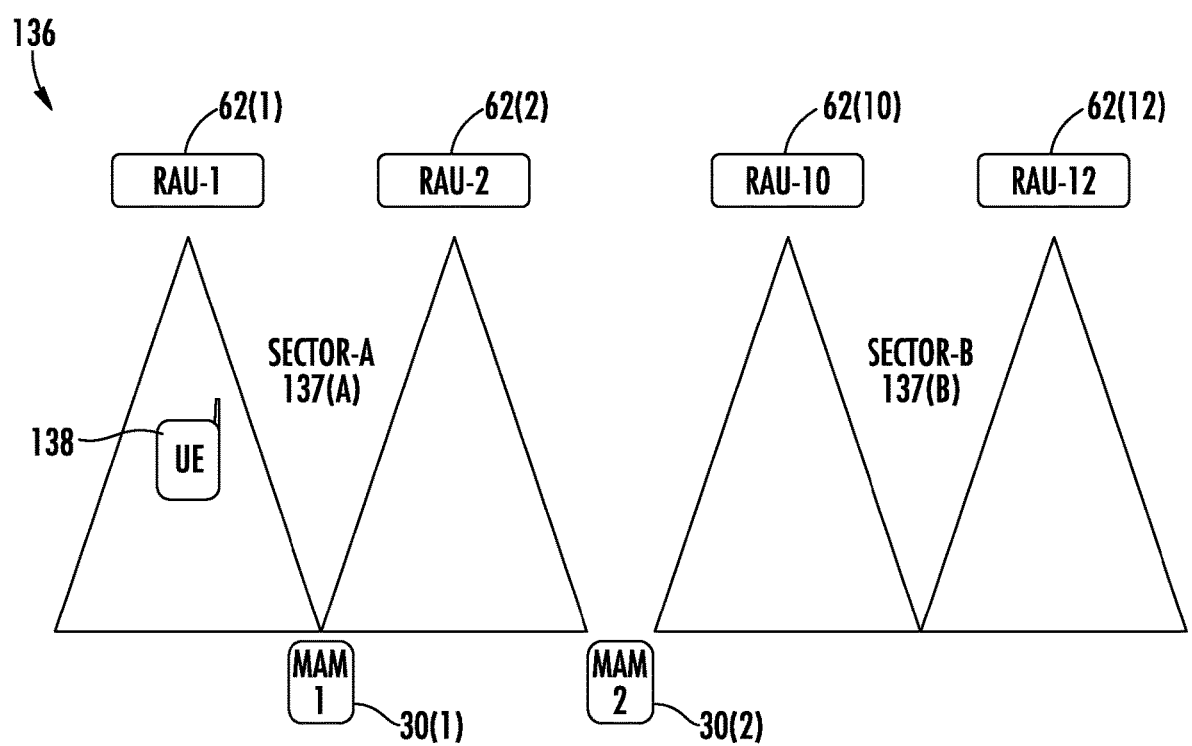
FIG. 9 is a schematic diagram of an exemplary WCS illustrating an AM receiving communications signals from multiple sectors and performing the exemplary process in FIG. 8 to simulate sector changes in an AM to simulate site walks in the WCS.

In this regard, FIG. 8 is a flowchart illustrating an exemplary process of simulating sector changes in the MAM 30 described above with regard to FIG. 5 in a WCS to simulate site walks in the WCS. FIG. 9 is a schematic diagram of an exemplary WCS 136 illustrating MAMs 30(1), 30(2) receiving communications signals from multiple sectors 137(A), 137(B) and performing the exemplary process in FIG. 8 to simulate sector changes in the MAMs 30(1), 30(2) to simulate site walks in the WCS 136. The exemplary process in FIG. 8 will be discussed in conjunction with the exemplary WCS 136 in FIG. 9.

In this regard, with reference to FIG. 8, using MAM 30(2) in the WCS 136 in FIG. 9 as an example, the MAM 30(2) collects information about received communications signals from the sectors 137(A), 137(B) (block 126 in FIG. 8). For example, each sector 137(A), 137(B) may be associated with the communications service area of a remote antenna unit in the WCS 136. A service area may also be associated with a communications service area of another transceiver, such as a WiFi router or base transceiver station (BTS) as another example. The MAM 30(2) could be triggered to start to collect information about the received communications signals from the sectors 137(A), 137(B) by an event, a manual command, and/or a periodic scheduling as non-limiting examples. This information can include measured signal strength of the received communications signals by the MAM 30(2) using the power meter 109, as previously discussed and described above with regard to FIG. 5. The emulation application 111 (shown in FIG. 5) in the MAM 30(2) artificially changes the signal strength (e.g., received signal strength indicator (RSSI)) of the received communications signals received from the sector 137(A) to simulate a walk away from or walk in to scenario with first sector 137(A) (block 128 in FIG. 8). The roaming application 113 (shown in FIG. 5) in the MAM 30(2) then allows the MAM 30(2) to decide to either leave sector A 137(A) or join sector A 137(A) based on the received communications signals from sector A 137(A) and sector B 137(B) (block 130 in FIG. 8) and the artificially lowering of the signal strength of received communications signals. The roaming application 113 then causes the MAM 30(2) to join another sector (e.g., a next best sector) in the WCS 136, such as sector B 137(B), based on the received artificially lowered signal information, such as signal strength information (e.g., RSSI) from another sector 137, such as sector A 137(A) (block 132 in FIG. 8). Reference signal received quality (RSRQ) or reference signal received power (RSRP), and/or building layout in which the WCS 136 is deployed could also be used as the signal information in lieu of or in addition to signal strength to allow the emulation application 113 to decide which next sector 137 to join. Thus, a site walk is simulated in the WCS 136, because the MAM 30(2) has not actually moved locations within sectors A and B 137(A), 137(B). The emulated site walk information regarding the received communications signals can then be shared by the MAM 30(2) along with other optional contextual information to another system and/or the customer of the WCS 136 (block 134 in FIG. 8). For example, this emulated site walk information can be provided to a remote unit in the WCS, such as RAUs 62(1), 62(2), 62(10), 62(12) shown in the WCS 136 in FIG. 9. The emulated site walk information can also be provided to a head end unit in a WCS, which can then be communicated to a base station or other system for analysis of the WCS.

Note that the simulated site walk provided by the MAM 30 in FIG. 9 can be done without interrupting normal communication services provided in the WCS 136, because the MAM 30 is using the normal communication signals distributed by the WCS 136 to simulate the site walk. Specialized communications signals are not required to be distributed by the WCS 136 in a test or site walk mode to obtain site walk information about the WCS 136. Further, the simulated site walk can be performed in real-time, at any time, during operation of the WCS 136. The simulated site walk information can be analyzed to determine, for example, if an unusual or undesired level of noise exists in the WCS 136 based on how the roaming application 113 in the MAM 30 decides to change sectors in the WCS 136.

Figure 10:
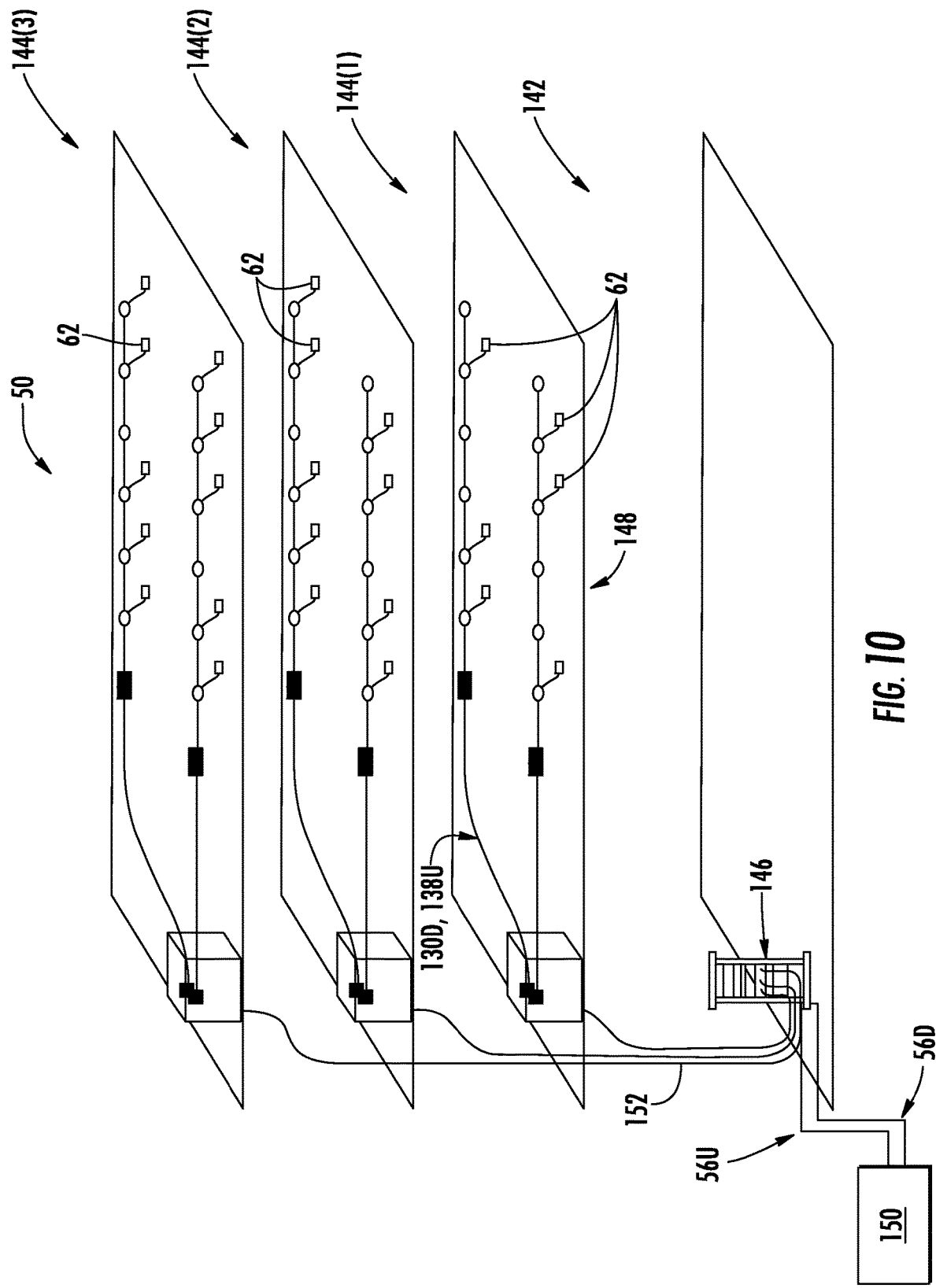
FIG. 10 is a partially schematic cut-away diagram of an exemplary building infrastructure in which a DAS including one or more components associated with MAMs can be employed.

The WCS described herein may also be provided in an indoor environment, as illustrated in FIG. 10. FIG. 10 is a partially schematic cut-away diagram of a building infrastructure 142 employing a WCS in the form of the DAS 50 described above. The building infrastructure 142 in this embodiment includes a first (ground) floor 144(1), a second floor 144(2), and a third floor 144(3). The floors 144(1)-144(3) are serviced by the central unit 146 to provide the antenna coverage areas 148 in the building infrastructure 142. The central unit 146 is communicatively coupled to the base station 150 to receive downlink communications signals 56D from the base station 150. The central unit 146 is communicatively coupled to the remote antenna units 132 to receive the uplink communications signals 56U from the remote antenna units 62, as previously discussed above. The downlink and uplink communications signals 56D, 56U communicated between the central unit 146 and the remote antenna units 62 are carried over a riser cable 152. The riser cable 152 may be routed through interconnect units (ICUs) 86(1)-86(3) dedicated to each floor 144(1)-144(3) that route the downlink and uplink communications signals 56D, 56U to the remote antenna units 62 and also provide power to the remote antenna units 62 via array cables 154.

Figure 11:
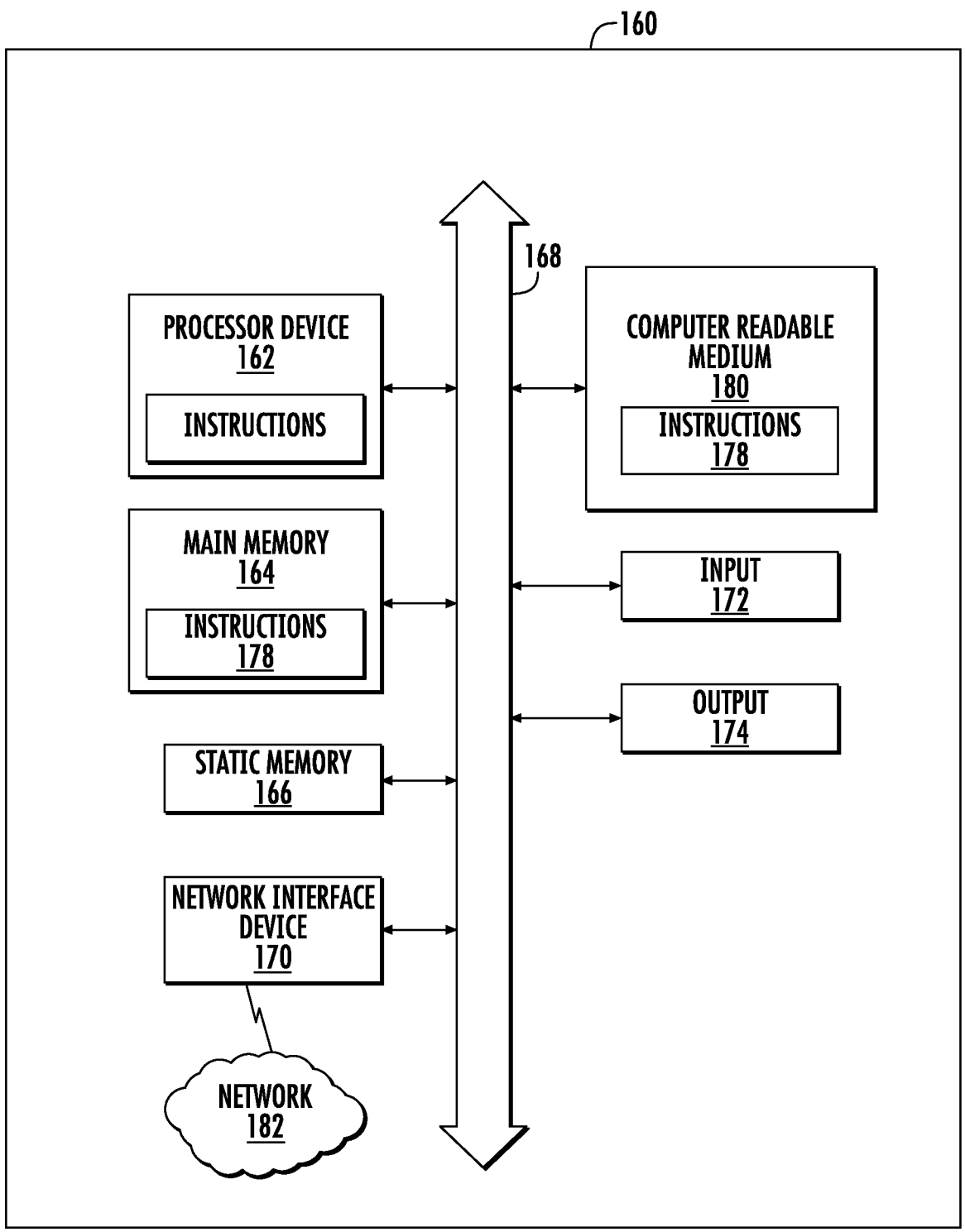
FIG. 11 is a schematic diagram of a generalized representation of an exemplary computer system that can be included in a MAM provided in the WCS, wherein the exemplary computer system is adapted to execute instructions from an exemplary computer readable medium.

FIG. 11 is a schematic diagram representation of additional detail illustrating a computer system 160 that could be employed in any MAM 30 disclosed herein. The computer system 160 is adapted to execute instructions for an application layer application 32 from an exemplary computer-readable medium to perform these and/or any of the functions or processing described herein. In this regard, the computer system 160 in FIG. 11 may include a set of instructions that may be executed to calculate gain of DAS segment in a DAS. The computer system 160 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 160 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 160 in this embodiment includes a processing device or processor 162, a main memory 164 (e.g., read-only memory (ROM), flash memory, dynamic random access memory (DRAM), such as synchronous DRAM (SDRAM), etc.), and a static memory 166 (e.g., flash memory, static random access memory (SRAM), etc.), which may communicate with each other via a data bus 168. Alternatively, the processor 162 may be connected to the main memory 164 and/or static memory 166 directly or via some other connectivity means. The processor 162 may be a controller, and the main memory 164 or static memory 166 may be any type of memory. Application level information 38 may be stored in static memory 166.

The processor 162 represents one or more general-purpose processing devices, such as a microprocessor, central processing unit, or the like. The processor 162 may be the processor 98 in the MAM 30 in FIG. 5. More particularly, the processor 162 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 162 is configured to execute processing logic in instructions for performing the operations and steps discussed herein.

The computer system 160 may further include a network interface device 170. The computer system 160 also may or may not include an input 172, configured to receive input and selections to be communicated to the computer system 160 when executing instructions. The computer system 160 also may or may not include an output 174, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 160 may or may not include a data storage device that includes instructions 178 stored in a computer-readable medium 180. The instructions 178 may also reside, completely or at least partially, within the main memory 164 and/or within the processor 162 during execution thereof by the computer system 160, the main memory 164 and the processor 162 also constituting computer-readable medium. The instructions 178 may further be transmitted or received over a network 182 via the network interface device 170.

While the computer-readable medium 180 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communications system, comprising:
a plurality of cables including a plurality of optical fibers; and
a plurality of remote units, at least one remote unit comprising: at least one antenna; at least one optical-to-electrical (O/E) converter; at least one electrical-to-optical (E/O) converter; and at least one application module, the at least one application module comprising:
at least one communications interface configured to receive communications signals from a plurality of sectors;
a meter configured to measure signal strength of the received communications signals; and
at least one processor configured to:
execute an emulation application to artificially change signal information of received communications signals from a first sector among the plurality of sectors; and
execute a roaming application to:
receive the artificially changed signal information of the received communications signals from the first sector;
determine if the application module is to leave or join a second sector among the plurality of sectors based on the received artificially changed signal information of the received communications signals from the first sector; and
join the second sector among the plurality of sectors if the received artificially changed signal information of the received communications signals from the first sector is less than signal information of the second sector to simulate a site walk of the application module from the first sector to the second sector.

2. The wireless communications system of claim 1, wherein each remote unit is communicatively coupled to at least one of the plurality of optical fibers.

3. The wireless communication system of claim 2, wherein the roaming application further communicates information regarding received signal information of the communications signals from the first sector and the second sector to communicate simulated site walk information of the application module in the wireless communication system.

4. The wireless communications system of claim 3, wherein the signal information is comprised of a received signal strength indicator (RSSI) information.

5. The wireless communications system of claim 3, wherein the signal information is comprised of reference signal received quality (RSRQ) information.

6. The wireless communications system of claim 3, wherein the signal information is comprised of reference signal received power (RSRP) information.

7. The wireless communications system of claim 3, wherein the at least one application module further comprises internal memory, wherein the at least one processor is further configured to store the simulated site walk information in the internal memory.

8. The wireless communications system of claim 3, wherein the at least one communications interface is comprised from the group consisting of: a cellular modem interface, a Bluetooth modem interface, a WiFi interface, and a base transceiver station (BTS) interface.

9. The wireless communications system of claim 3, further configured to communicate the simulated site walk information over at least one downlink optical fiber of the plurality of optical fibers communicatively coupled to the at least one communications interface.

10. The wireless communications system of claim 3, further configured to communicate the simulated site walk information over at least one uplink optical fiber of the plurality of optical fibers communicatively coupled to the at least one communications interface.

11. The wireless communications system of claim 3, wherein the plurality of cables further comprises a plurality of electrical media.

12. A wireless communications system, comprising:
a plurality of cables, the cables comprising a plurality of optical uplink communications media and a plurality of optical downlink communications media;
a central unit configured to:
receive a downlink communications signal from a communications system;
distribute the downlink communications signal over at least one of the optical downlink communications media to a plurality of remote units;
receive an uplink communications signal from the plurality of remote units over at least one of the optical uplink communications media; and
transmit the uplink communications signal to the communications system;
each remote unit among the plurality of remote units configured to:
receive the downlink communications signal from the central unit over the at least one of the optical downlink communications media;
transmit the downlink communications signal to at least one client device;
receive the uplink communications signal from the at least one client device; and
transmit the uplink communications signal to the central unit over the at least one of the optical uplink communications media; and
at least one application module comprising:
at least one communications interface configured to receive communications signals from a plurality of sectors;
a meter configured to measure signal information of the received communications signals; and
at least one processor configured to:
execute an emulation application to artificially change the signal information of received communications signals from a first sector among the plurality of sectors; and
execute a roaming application to:
receive the artificially changed signal information of the received communications signals from the first sector;
determine if the at least one application module is to leave or join a second sector among the plurality of sectors based on the received artificially changed signal information of the received communications signals from the first sector; and
join the second sector among the plurality of sectors if the received artificially changed signal information of the received communications signals from the first sector is less than signal information of the second sector to simulate a site walk of the at least one application module from the first sector to the second sector.

13. The wireless communications system of claim 12, wherein the plurality of remote units comprises at least three remote units disposed on at least three floors of an infrastructure.

14. The wireless communications system of claim 13, wherein the central unit comprises at least one O/E converter and at least one E/O converter.

15. The wireless communications system of claim 13, wherein the roaming application further communicates information regarding received signal information of the communications signals from the first sector and the second sector to communicate simulated site walk information of the at least one application module.

16. The wireless communications system of claim 13, wherein the plurality of cables includes a plurality of riser cables extending vertically through the infrastructure.

17. The wireless communications system of claim 16, further comprising at least one interconnect unit optically connected to at least one of the riser cables and optically connected to a plurality of the remote units.

* * * * *

UNITED STATES PATENT AND TRADEMARK OFFICE
CERTIFICATE OF CORRECTION

PATENT NO. : 10,608,758 B2
APPLICATION NO. : 16/056858
DATED : March 31, 2020
INVENTOR(S) : Aravind Chamarti et al.

It is certified that error appears in the above-identified patent and that said Letters Patent is hereby corrected as shown below:

In the Claims

In Column 19, Line 44, Claim 3, delete "communication" and insert -- communications --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*